United States Patent
Chu et al.

(10) Patent No.: US 11,127,579 B2
(45) Date of Patent: Sep. 21, 2021

(54) ZIRCON ID-TIMS PB ISOTOPE DETERMINATION METHOD USING MULTIPLE ION COUNTERS WITH DYNAMIC MULTI-COLLECTION PROTOCOL

(71) Applicant: Institute of Geology and Geophysics, Chinese Academy of Sciences, Beijing (CN)

(72) Inventors: Zhuyin Chu, Beijing (CN); Chaofeng Li, Beijing (CN); Wengui Liu, Beijing (CN); Wei Wang, Beijing (CN); Jinghui Guo, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 16/915,965

(22) Filed: Jun. 29, 2020

(65) Prior Publication Data
US 2020/0335319 A1   Oct. 22, 2020

(30) Foreign Application Priority Data
Oct. 29, 2019   (CN) .......................... 201911034352.8

(51) Int. Cl.
*H01J 49/28* (2006.01)
*H01J 49/00* (2006.01)
(Continued)

(52) U.S. Cl.
CPC .............. *H01J 49/28* (2013.01); *G01N 30/72* (2013.01); *H01J 49/0027* (2013.01);
(Continued)

(58) Field of Classification Search
None
See application file for complete search history.

(56) References Cited

U.S. PATENT DOCUMENTS 5,414,259 A * 5/1995 Kingston ............... G01N 30/88
250/282
8,592,757 B2 * 11/2013 Schwieters ........... H01J 49/061
250/283

OTHER PUBLICATIONS

Dean et al. "Selection of Mode for the Measurement of Lead Isotope Ratios by Inductively Coupled Plasma Mass Spectrometry and its Application to Milk Powder Analysis" Journal of Analytical Atomic Spectrometry 2 (Jun. 1987) (Year: 1987).*

(Continued)

*Primary Examiner* — James Choi

(57) ABSTRACT

A zircon ID-TIMDS Pb isotope determination method by multiple ion counters with a dynamic multi-collection protocol is provided. Compared with a commonly used multi-ion counter static determination method, the method provided by the present invention completely eliminates influences of gain differences of the different ion counters on determination results of Pb isotopes. Compared with a conventional single-ion counter determination method with five times of peak-jumps, the method provided by the present invention can obtain all of Pb isotope ratios with two times of peak-jumps, which increases the collection efficiency of Pb isotope ion beams and decreases influences of ion beam stability on Pb isotope analysis results. Consequently, compared with a multi-ion counter static method and a single-ion counter peak-jumping method, the method provided by the present invention improves the Pb isotope analysis precision for the single-grain zircon ID-TIMS U—Pb dating method (with a $^{205}$Pb tracer), having application potentials.

7 Claims, 4 Drawing Sheets

|  | IC1 | IC2 | IC3 | IC4 |
|---|---|---|---|---|
| J1 | $^{205}$Pb | $^{206}$Pb | $^{207}$Pb | $^{208}$Pb |
| J2 | $^{204}$Pb | $^{205}$Pb | $^{206}$Pb | $^{207}$Pb |

(51) Int. Cl.
*G01N 30/72* (2006.01)
*H01J 49/16* (2006.01)
*G01N 30/88* (2006.01)

(52) U.S. Cl.
CPC ...... *H01J 49/16* (2013.01); *G01N 2030/8868* (2013.01); *H01J 49/0036* (2013.01)

(56) References Cited

OTHER PUBLICATIONS

Feng et al. "Optimization of the double spike technique using peak jump collection by a Monte Carlo method: an example for the determination of Ca isotope ratios" J. Anal. At. Spectrom., 30, 2403 (2015) (Year: 2015).*

* cited by examiner

|  | IC1 | IC2 | IC3 | IC4 |
|---|---|---|---|---|
| J1 | $^{205}$Pb | $^{206}$Pb | $^{207}$Pb | $^{208}$Pb |
| J2 | $^{204}$Pb | $^{205}$Pb | $^{206}$Pb | $^{207}$Pb |

US 11,127,579 B2

ZIRCON ID-TIMS PB ISOTOPE DETERMINATION METHOD USING MULTIPLE ION COUNTERS WITH DYNAMIC MULTI-COLLECTION PROTOCOL

CROSS REFERENCE OF RELATED APPLICATION

The application claims priority under 35 U.S.C. 119(a-d) to CN 201911034352.8, filed Oct. 29, 2019.

BACKGROUND OF THE PRESENT INVENTION

Field of Invention

The present invention relates to a technical field of isotope mass spectrometric analysis, and more particularly to a Pb isotope determination method by multiple ion counters with a dynamic multi-collection protocol, which can be applied in the single-grain zircon ID-TIMS (Isotope Dilution-Thermal Ionization Mass Spectrometry) U—Pb dating technology.

Description of Related Field

The zircon U—Pb method is a most important isotope geochronology method and is widely applied in dating of various geological events, such as granite formation age and stratigraphic age. The zircon U—Pb methods mainly comprise the SIMS (Secondary Ion Mass Spectrometry) in-situ method, the LA-ICP-MS (Laser Ablation-Inductively Coupled Plasma-Mass Spectrometry) in-situ method, and the ID-TIMS (Isotope Dilution-Thermal Ionization Mass Spectrometry) method. The ID-TIMS method has the characteristic of high precision and is the primary method for zircon U—Pb age determination. In recent years, with the continuous improvement of the analysis technology, better than 0.05% precision of age determination has been achieved with the ID-TIMS method.

The ID-TIMS U—Pb method requires to dissolve the zircon grains and add a $^{205}$Pb-$^{235}$U tracer, then separate U and Pb from the sample with a small anion exchange column, and finally determine the isotope ratios of U and Pb with a thermal ionization mass spectrometer and obtain the U—Pb age of the zircon through calculation. Because only the trace amount of Pb (generally in pg, i.e., $10^{-12}$ g level) is contained inside a single-grain zircon, the Pb isotopes therefore are generally determined with the ion counter.

In the conventional single-grain zircon ID-TIMS U—Pb method, the Pb isotopes are generally determined through peak-jumping with the center channel SEM (Secondary Electronic Multiplier) or Daly detector; that is to say, through changing the magnetic field, the Pb isotopes including $^{204}$Pb, $^{205}$Pb, $^{206}$Pb, $^{207}$Pb and $^{208}$Pb successively enter the center channel SEM or the Daly detector and are determined one by one. The method requires five jumps to complete one cycle of zircon Pb isotope determination. Thus, the collection efficiency of the Pb isotope ion beams is low, and consequently the determination time is long. In order to reach the high precision, the determination time for each sample requires 3-4 hours. Meanwhile, because the different isotopes are successively determined, the different isotopes are not determined at the same time, the ion beam stability has influences on the precision and accuracy of the Pb isotope determination results.

The new thermal ionization mass spectrometer is generally equipped with the multi-ion counter system. For example, the TRITON PLUS mass spectrometer produced by the Thermo Fisher Scientific Company is equipped with multiple ion counters specifically for Pb isotope analysis for the zircon ID-TIMS U—Pb method; the Phoenix mass spectrometer produced by Isotopx Company is equipped with the multiple Channeltron ion counters. The current common multi-ion counter determination method adopts the static multi-collection method. The static method can collect and determine all of the Pb isotopes at the same time without peak-jumping. With the static method, the ion beam collection efficiency is high; the Pb isotope determination results are not influenced by the ion beam stability; and the determination time for a sample can be relatively short. However, because gain differences exist between the different ion counters of the multi-ion counter system and the stability of the gain of the ion counters is usually poor, before and after the determination of a sample, it is necessary to determine a standard such as NIST981 or NIST982 Pb once with the multi-ion counter static method, so as to correct the gain differences between the multiple ion counters. This is usually named as standard-sample-bracketing method, i.e. SSB method. Nevertheless, because the gain stability of the ion counters is relatively poor, when determining the Pb isotopes with the static multi-collection method by the multiple ion counters, the precision and accuracy of the Pb isotope determination results are still not ideal even with the SSB method. Thus, currently, the multi-ion counter system is rarely applied in zircon ID-TIMS U—Pb dating.

SUMMARY OF THE PRESENT INVENTION

In view of the above problems, aiming at a Pb isotope analysis technology for the single-grain zircon ID-TIMS (Isotope Dilution-Thermal Ionization Mass Spectrometry) U—Pb dating (with a $^{205}$Pb tracer), the main purpose of the present invention is to establish a high-precision analysis method for Pb isotopes of a $^{205}$Pb—Pb mixture by multiple ion counters with a dynamic multi-collection protocol.

A zircon ID-TIMS Pb isotope determination method by multiple ion counters with a dynamic multi-collection protocol is provided, as shown in FIG. 1, comprising steps of:

(S1) adopting at least four ion counters of a thermal ionization mass spectrometer, respectively denoted as IC1, IC2, IC3 and IC4;

(S2) designing two times of peak-jumps for isotope determination, respectively denoted as J1 and J2;

(S3) determining all of five isotopes of $^{204}$Pb, $^{205}$Pb, $^{206}$Pb, $^{207}$Pb and $^{208}$Pb, particularly comprising steps of at a first jump (J1), determining $^{205}$Pb, $^{206}$Pb, $^{207}$Pb and $^{208}$Pb respectively by the four ion counters IC1, IC2, IC3 and IC4; at a second jump (J2), determining $^{204}$Pb, $^{2005}$Pb, $^{206}$Pb and $^{207}$Pb respectively by the four ion counters IC1, IC2, IC3 and IC4; and (S4) through appropriately combining Pb isotope signal intensities obtained by the first and second jumps, calculating and obtaining Pb isotope ratios of $^{204}$Pb/$^{206}$Pb, $^{205}$Pb/$^{206}$Pb, $^{207}$Pb/$^{206}$Pb and $^{208}$Pb/$^{206}$Pb, particularly comprising steps of:

(S41) with $^{207}$Pb determined by the IC3 from the first jump and $^{26}$Pb determined by the IC3 from the second jump, directly obtaining the isotope ratio of $^{207}$Pb/$^{206}$Pb, denoted as $^{207}$Pb$_{IC3\text{-}J1}$/$^{206}$Pb$_{IC3\text{-}J2}$;

(S42) with $^{208}$Pb determined by the IC4 from the first jump and $^{207}$Pb determined by the IC4 from the second jump, obtaining $^{208}$Pb/$^{207}$Pb, denoted as $^{208}$ $Pb_{IC4\text{-}J1}/^{207}Pb_{IC4\text{-}J2}$; through calculating with a formula of $^{208}Pb/^{206}Pb=^{207}Pb_{IC3\text{-}J1}/^{206}Pb_{IC3\text{-}J2}\times^{208}Pb_{IC4\text{-}J1}/^{207}Pb_{IC4\text{-}J2}$, obtaining $^{208}Pb/^{206}Pb$;

(S43) with $^{205}Pb$ determined by the IC2 from the second jump and $^{206}Pb$ determined by the IC2 from the first jump, directly obtaining $^{205}Pb/^{206}Pb$, denoted as $^{205}Pb_{IC2\text{-}J2}/^{206}Pb_{IC2\text{-}J1}$; and (S44) with $^{204}Pb$ determined by the IC1 from the second jump and $^{205}Pb$ determined by the IC from the first jump, obtaining $^{204}Pb/^{205}Pb$, denoted as $^{204}Pb_{IC1\text{-}J2}/^{205}Pb_{IC1\text{-}J1}$; through calculating with a formula of $^{204}Pb/^{206}Pb=^{205}Pb_{IC2\text{-}J2}/^{206}Pb_{IC2\text{-}J1}\times^{204}Pb_{IC1\text{-}J2}/^{205}Pb_{IC1\text{-}J1}$, obtaining $^{204}Pb/^{206}Pb$.

According to the above method, the ratios of $^{204}Pb/^{206}Pb$, $^{205}Pb/^{206}Pb$, $^{207}Pb/^{206}Pb$ and $^{208}Pb/^{206}Pb$ are all obtained through isotope signal intensities determined by peak-jumps with a same ion counter, thus completely eliminating influences of gain differences of the different ion counters on determination results of the Pb isotopes.

According to the method provided by the present invention, a linear interpolation method is adopted to correct influences of ion beam stability on determination results of $^{204}Pb/^{206}Pb$, $^{205}Pb/^{206}Pb$, $^{207}Pb/^{206}Pb$ and $^{208}Pb/^{206}Pb$ during a peak-jump determination process with the multiple ion counters (newly produced thermal ionization mass spectrometers are all installed with a linear interpolation calculation software for the dynamic determination method).

The method provided by the present invention has beneficial effects as follows.

Compared with the traditional determination method for the Pb isotopes of a $^{205}Pb$—Pb mixture by five times of peak-jumps with a single ion counter (SEM (Secondary Electronic Multiplier) or Daly detector), the method provided by the present invention can obtain all of the Pb isotope ratios only with two times of peak-jumps, thus increasing the collection efficiency of the Pb ion beam by 2.5 times and meanwhile decreasing the influences of the ion beam stability on the Pb isotope determination results.

Compared with the Pb isotope determination method by the multiple ion counters with a static multi-collection protocol, the method provided by the present invention completely eliminates the influences of the gain differences of the different ion counters on the determination results of the Pb isotopes, thus greatly improving the determination precision of the Pb isotopes of a $^{205}Pb$—Pb mixture.

The method provided by the present invention is especially applicable to the Pb isotope analysis for the single-grain zircon ID-TIMS U—Pb dating method.

The protocol of the method provided by the present invention has the universality and is suitable for the various types of mass spectrometers equipped with the multi-ion counter system which can be applied for the Pb isotope analysis of a $^{205}Pb$—Pb mixture.

BRIEF DESCRIPTION OF THE DRAWINGS

In FIG. 3, a full line represents a mean, and dotted lines represent a range of mean±2SD.

FIG. 4A and FIG. 4B show determination results of Qinghu zircon U—Pb age, wherein: FIG. 4A is a U—Pb Concordia age diagram; and FIG. 4B is a diagram of weighted average $^{206}Pb/^{238}U$ age.

FIG. 5A and FIG. 5B show determination results of TEMORA zircon U—Pb age, wherein: FIG. 5A is a U—Pb Concordia age diagram; and FIG. 5B is a diagram of weighted average $^{206}Pb/^{238}U$ age.

In figures: J1 and J2 respectively represent a first jump and a second jump; IC1, IC2, IC3 and IC4 respectively represent the first, second, third and fourth ion counters; SEM represents a secondary electronic multiplier; and CDD represents a compact discrete dynode multiplier.

DETAILED DESCRIPTION OF THE PREFERRED EMBODIMENT

The present invention is further described in detail with examples as follows.

Figures 1, 2:
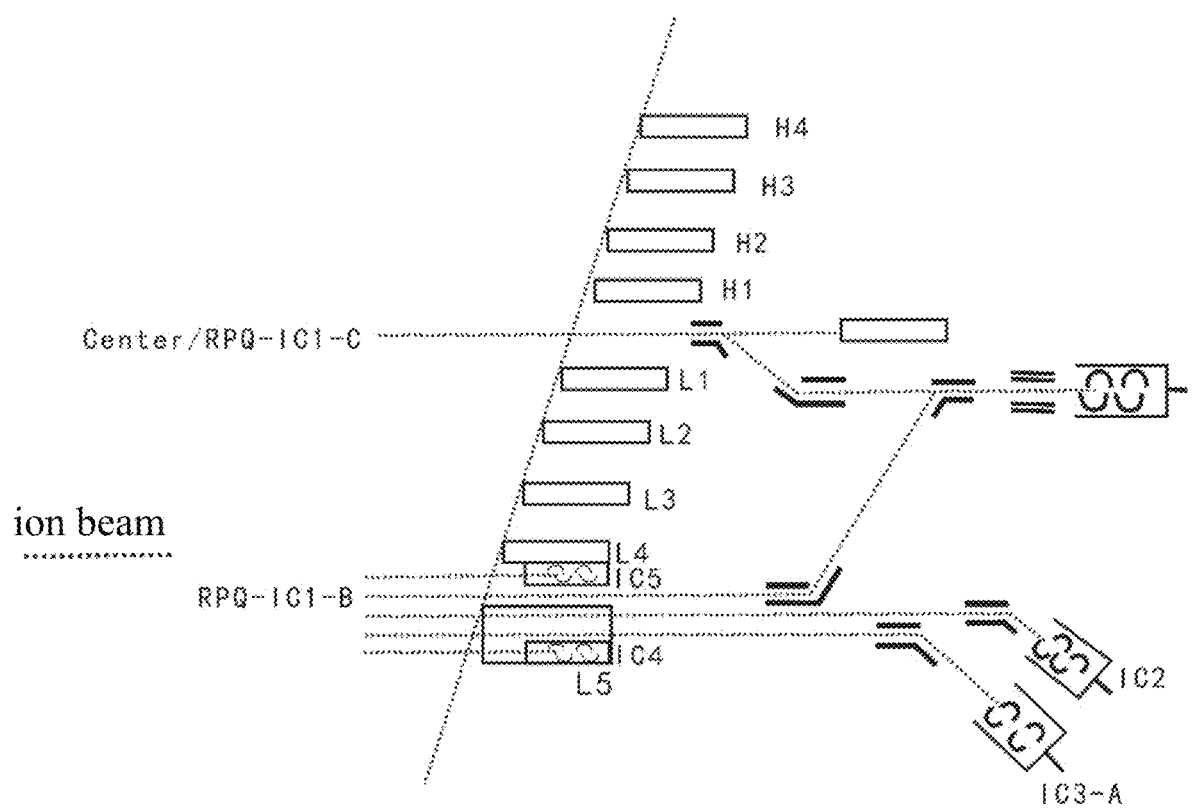
FIG. 1 is a sketch view to illustrate a dynamic multi-collection method for Pb isotopic analysis of a $^{205}Pb$—Pb mixture using multiple ion counters according to the present invention.
FIG. 2 is a configuration diagram of a multi-ion counter system of a TRITON PLUS thermal ionization mass spectrometer according to the present invention.

Referring to FIG. 1, the present invention provides a determination method for Pb isotopes of a $^{205}Pb$—Pb mixture with a dynamic multi-collection protocol by multiple ion counters of a thermal ionization mass spectrometer. The method is suitable for various types of mass spectrometers equipped with a multi-ion counter system which can be applied for Pb isotope analysis of a $^{205}Pb$—Pb mixture. The established method comprises steps of: adopting four ion counters; with two times of peak-jumps, determining all of the Pb isotopes including $^{204}Pb$, $^{205}Pb$, $^{206}Pb$, $^{207}Pb$ and $^{208}Pb$, wherein $^{205}Pb$ is from a tracer; then, through designing algorithms, eliminating the influences of the gain differences of the multiple ion counters and decreasing the influences of ion beam stabilities on the Pb isotope determination results. The established method is especially applicable to high-precision Pb isotope determination for a single-grain zircon ID-TIMS (Isotope Dilution-Thermal Ionization Mass Spectrometry) U—Pb method (using a $^{205}Pb$ tracer). With the TRITON PLUS thermal ionization mass spectrometer produced by the Thermo Fisher Scientific Company as an example, the present invention is described as follows.

1. Mass Spectrometric Determination Method

The TRITON PLUS thermal ionization mass spectrometer of Thermo Fisher Scientific Company is equipped with a multi-ion counter (MIC) system specifically for Pb isotope analysis for zircon ID-TIMS U—Pb dating (as shown in FIG. 2). The MIC system comprises three SEM (Secondary Electronic Multiplier) and two CDD (Compact Discrete Dynode) electronic multipliers, wherein the ion counter IC5 (CDD) is bundled on the L4 Faraday cup (a position of the IC5 can be slightly adjusted through adjusting the position of the L4 Faraday cup); the ion counters IC2 (SEM) and IC4 (CDD) are located on the L5 Faraday cup position. According to the present invention, three SEM ion counters and one CDD ion counter therein are used with a dynamic multi-collection peak-jumping method to determine the Pb isotopes of a $^{205}Pb$—Pb mixture. For the multiple ion counters of TRITON PLUS, the detailed settings of the multiple ion counters and the peak-jumping method thereof are listed in Table 1. Through designing two times of peak-jumps, the ion beams of different Pb isotopes are collected, wherein: at the first jump, the virtual mass referring to the center of the multi-collection system of the instrument is set to be 223.04, the ion counter IC5-L4 (CDD) collects $^{208}Pb$, IC1 B (SEM)

collects $^{207}$Pb, IC2-L5 (SEM) collects $^{206}$Pb, and IC3A (SEM) collects $^{205}$Pb; at the second jump, the virtual mass referring to the center of the multi-collection system of the instrument is set to be 221.95, the ion counter IC5-L4 (CDD) collects $^{207}$Pb, IC1 B (SEM) collects $^{206}$Pb, IC2-L5 (SEM) collects $^{205}$Pb, and IC3A (SEM) collects $^{204}$Pb. For each jump, the integration time is 4.194 seconds, and the idle time before integrations is set to 1 second. Because only the position of IC5-L4 can be slightly adjusted through adjusting the position of the L4 Faraday cup and the positions of IC2-L5, IC3A and IC1-B cannot be adjusted, the present invention ensures perfect peak alignments of different ion counters for the two jumps through setting Zoom dispersion parameters and adjusting the position of the L4 Faraday cup.

When using the multi-ion counter system, it is required to determine the dead time and the yield of each ion counter. The present invention firstly determines the dead time of each ion counter by measuring the $^{208}$Pb/$^{206}$Pb of NIST981 Pb standard using a peak-jumping method with an ion counter; that is to say, for each ion counter, the $^{208}$Pb signal intensity is increased from 1 mV to 10 mV stepwise, and under different signal intensities, the ratios of $^{208}$Pb/$^{206}$Pb are respectively determined by a peak-jumping method; through monitoring the correlation of the determination results of the ratio of $^{208}$Pb/$^{206}$Pb with the $^{208}$Pb signal intensity, the dead time of each ion counter is determined. Moreover, the yield of the ion counters was determined by switching a stable 5-10 mV $^{208}$Pb ion beam sequentially into the center Faraday cup, IC5, IC1B, IC2 and IC3A as shown in Table 2; that is to say, the $^{208}$Pb signal is adjusted to be stable at 5-10 mV, and the $^{208}$Pb signal is determined successively with the center Faraday cup and the different ion counters one by one; through the ratios of the $^{208}$Pb measured by each ion counter to that determined by the center Faraday cup, the yield of each ion counter relative to the center Faraday cup is obtained. It is required to ensure that the yield of each ion counter is greater than 90%; if the yield for an ion counter is smaller than 90%, the high voltage applied for the ion counter should be appropriately increased.

2. Sample Determination Process

When determining the Pb isotopes, firstly slowly increasing a temperature of the filament to about 1000° C.; tuning and focusing the ion beam with the $^{208}$Pb signal detected by the IC5-L4 or with the $^{206}$Pb signal detected by the IC2-L5; subsequently, slowly ramping the temperature of the filament to increase the ion beam intensity; after the ion beam intensity reaches the expected value, starting to collect the data. For each data block, 25 cycles of data are collected; and there are totally 20 blocks of data to be acquired. Prior to each bock, peak centering is run for the first and the second jumps with the $^{206}$Pb signal detected by IC2-L5 and IC1-B, respectively, to re-locate the ion beams into the corresponding ion counters; every four blocks, the ion beam is re-focused with the $^{206}$Pb signal detected by IC2-L5 once.

For the zircon sample, after completing the determination of the Pb isotopes, further increasing the temperature of the filament to about 1200° C.-1300° C.; and determining the U isotope composition (determining $UO_2^+$). The U isotopes are determined by peak-jumping using the center channel SEM (IC1 C). With $^{17}$O/$^{16}$O=0.00039 and $^{18}$O/$^{16}$O=0.00205, the interferences of $^{235}$U$^{17}$O$^{18}$O on $^{238}$U$^{16}$O$_2$ are corrected. The fractionation effects of the U isotopes are corrected through an external calibration method with the U 500 determination results. The detailed U mass spectrometric determination method refers to document 1.

Reference document 1: Chu et al., Ultra-low blank analytical procedure for high precision CA-ID-TIMS U—Pb dating of single grain zircons, Chinese Science Bulletin, 2016, Volume 61, pages 1121-1129.

3. Method for Processing Pb Isotope Data

The method comprises steps of:

(1) with $^{207}$Pb determined from the first jump and $^{206}$Pb determined from the second jump by the IC1-B (SEM), obtaining the ratio of $^{207}$Pb/$^{206}$Pb; with a linear interpolation method, correcting the influences of ion beam stability on the determination results of $^{207}$Pb/$^{206}$Pb;

(2) with $^{208}$Pb determined from the first jump and $^{207}$Pb determined from the second jump by the IC5 (CDD), obtaining the ratio of $^{208}$Pb/$^{207}$Pb; with the linear interpo-

TABLE 1

Dynamic multi-collection method for Pb isotopic determination of a $^{205}$Pb—Pb mixture by multiple ion counters of TRITON PLUS thermal ionization mass spectrometer

| | Virtual mass of center Faraday cup | IC4-L5 (CDD) | IC3-A (SEM) | IC2-L5 (SEM) | RPQ/IC1-B (SEM) | IC5-L4 (CDD) | Integration time (s) | Idle time (s) |
|---|---|---|---|---|---|---|---|---|
| J1 | 223.04 | $^{204}$Pb | $^{205}$Pb | $^{206}$Pb | $^{207}$Pb | $^{208}$Pb | 4.194 | 1 |
| J2 | 221.95 | $^{203}$Tl | $^{204}$Pb | $^{205}$Pb | $^{206}$Pb | $^{207}$Pb | 4.194 | 1 |

TABLE 2

Method for Yield determination of the multiple ion counters

| Line | IC3 A | IC2-L5 | RPQ/IC1 B | IC5-L4 | Center Faraday cup | Integration time (s) | Idle time (s) |
|---|---|---|---|---|---|---|---|
| 1 | | | | | $^{208}$Pb | 4.194 | 3 |
| 2 | $^{205}$Pb | $^{206}$Pb | $^{207}$Pb | $^{208}$Pb | 222.93 | 4.194 | 3 |
| 3 | | $^{207}$Pb | $^{208}$Pb | | 224.01 | 4.194 | 3 |
| 4 | | $^{208}$Pb | | | 225.08 | 4.194 | 3 |
| 5 | $^{208}$Pb | | | | 226.13 | 4.194 | 3 | lation method, correcting the influences of the ion beam stability on the determination results of $^{208}$Pb/$^{207}$Pb;

(3) calculating with a formula of $^{208}$Pb/$^{206}$Pb=$^{208}$Pb/$^{207}$Pb×$^{207}$Pb/$^{206}$Pb, obtaining $^{208}$Pb/$^{206}$Pb;

(4) with $^{205}$Pb determined from the second jump and $^{206}$Pb determined from the first jump by the IC2-L5 (SEM), obtaining the ratio of $^{205}$Pb/$^{206}$Pb; with the linear interpolation method, correcting the influences of the ion beam stability on the determination results of $^{205}$Pb/$^{206}$Pb;

(5) with $^{204}$Pb determined from the second jump and $^{205}$Pb determined from the first jump by the IC3 (SEM), obtaining the ratio of $^{204}$Pb/$^{205}$Pb; with the linear interpolation method, correcting the influences of the ion beam stability on the determination results of $^{204}$Pb/$^{205}$Pb; and (6) calculating with a formula of $^{204}$Pb/$^{206}$Pb=$^{205}$Pb/$^{206}$Pb×$^{204}$Pb/$^{205}$Pb, obtaining $^{204}$Pb/$^{206}$Pb.

Through the above method, all of the Pb isotope ratios after correcting the influences of the ion beam stabilities through the linear interpolation method are obtained, including $^{204}$Pb/$^{206}$Pb, $^{205}$Pb/$^{206}$Pb, $^{207}$Pb/$^{206}$Pb and $^{208}$Pb/$^{206}$Pb.

The ratios of $^{204}$Pb/$^{206}$Pb, $^{205}$Pb/$^{206}$Pb, $^{207}$Pb/$^{206}$Pb and $^{208}$Pb/$^{206}$Pb obtained through the above method are all equivalently determined by a same ion counter using a peak-jumping method, thus completely eliminating influences of gain differences of different ion counters on determination results of the Pb isotopes.

According to the present invention, the isotope signal data collected by the IC4-L5 ion counter is not used.

During the isotope determination process of ultra-small amount of Pb (pg level), the trace amount of impurities in the sample, such as the organics, may influence the determination result of the Pb isotopes. Thus, the impurities require to be gradually burned off; and because the influences of the interfering substances may exist, the data at the beginning stage of a determination are generally required to be discarded. During the data processing process, these abnormal data are deleted with the Tripoli software (can be downloaded from http://www.earth-time.org/), and then the final Pb isotope determination results can be obtained.

The fractionation effects of the Pb isotopes for the zircon sample are required to be corrected through an external calibration method with the NIST981 Pb isotope determination results.

Example 1: Pb Isotope Analysis of $^{205}$Pb-NIST981 Mixed Solution

The present invention firstly conducts the Pb isotope determination on a mixed solution of a NIST981 standard solution and a $^{205}$Pb tracer, so as to evaluate the precision and accuracy of the determination method. The Pb isotope determination results obtained through the multi-ion counter dynamic multi-collection method provided by the present invention are compared with the Pb isotope determination results obtained through other methods, including the multi-ion counter static multi-collection method and the single-ion counter peak-jumping method.

The $^{205}$Pb-NIST981 mixed solution is prepared through following steps of: taking 500 μL of $^{205}$Pb-$^{235}$U tracer (the concentration of $^{205}$Pb is 9.223 pmol/g; the abundances of $^{204}$Pb, $^{205}$Pb, $^{206}$Pb, Pb and $^{208}$Pb are respectively 0.0046%, 99.85%, 0.0384%, 0.0308% and 0.0731%) and 50 μL of 290 ng/g NBS981 standard solution; adding into a 3 mL Teflon PFA beaker, and capping the beaker tightly; placing the beaker onto a hot-plate, and fluxing at 80° C. for at least one week, so as to ensure the sample-tracer Pb isotopic equilibration. 2 μL of the $^{205}$Pb-NIST981 mixed solution (corresponding to 50 pg of Pb) are loaded on zone-fined high purity Re filaments for mass spectrometric determination, and the detailed sample loading method refers to document 1. Preparation of the $^{205}$Pb-NIST981 mixed solution and the sample loading are conducted in a class 100 fume hood and/or class 100 clean bench in a class 1000 clean room.

After subtraction of the contribution of the tracer from the Pb isotope determination results of the mixed solution, the determination results of $^{204}$Pb/$^{206}$Pb, $^{207}$Pb/$^{206}$Pb and $^{208}$Pb/$^{206}$Pb of the NIST981 are obtained, listed in Table 3.

Correspondingly, the mean (n=20) of the determination results of $^{204}$Pb/$^{206}$Pb, $^{207}$Pb/$^{206}$Pb and $^{208}$Pb/$^{206}$Pb of the NIST981 Pb standard (also with a sample load amount of 50 pg) by the multiple ion counters of the TRITON PLUS thermal ionization mass spectrometer with a static collection method (the IC4-L5 CDD collects $^{204}$Pb, the IC2-L5 SEM collects $^{206}$Pb, the RPQ/IC1B SEM collects $^{207}$Pb, and the IC5-L4 CDD collects $^{208}$Pb) are also listed in Table 3 (determining 30 blocks for each sample, and collecting 20 cycles of data for each block). The mean (n=20) of the determination results of $^{204}$Pb/$^{206}$Pb, $^{207}$Pb/$^{206}$Pb and $^{208}$Pb/$^{206}$Pb of the NIST981 Pb standard (again with a sample load amount of 50 pg) through a peak-jumping method (totally four jumps, for respectively determining $^{204}$Pb, $^{206}$Pb, $^{207}$Pb and $^{208}$Pb) with the center channel SEM ion counter of the TRITON PLUS thermal ionization mass spectrometer are also listed in Table 3 (determining 15 blocks for each sample, and collecting 20 cycles of data for each block).

Figure 3:
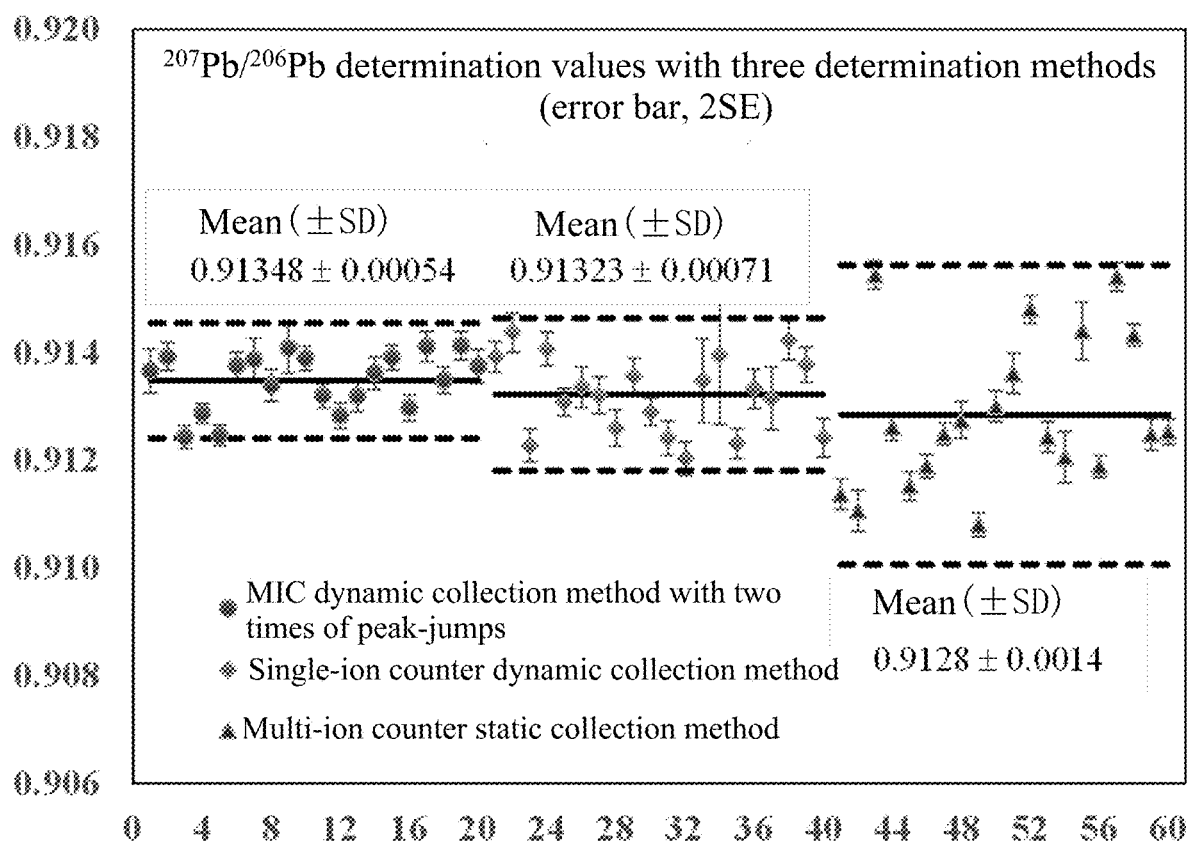
FIG. 3 shows comparison of determination results of $^{207}Pb/^{206}Pb$ of NIST981 with a method provided by the present invention, a multi-ion counter static method, and a single-ion counter peak-jumping method.

FIG. 3 shows comparison of $^{207}$Pb/$^{206}$Pb determination results of NIST981 with above three determination methods.

It can be seen from Table 3 and FIG. 3 that: the determination internal precision and external precision of $^{204}$Pb/$^{206}$Pb, $^{207}$Pb/$^{206}$Pb and $^{208}$Pb/$^{206}$Pb of the NIST981 Pb standard with the method provided by the present invention are obviously better than that with the single-ion counter peak-jumping method and the multi-ion counter static method.

TABLE 3

| | Pb isotope determination results of NIST981 with multi-ion counter dynamic multi-collection method | | | | | |
|---|---|---|---|---|---|---|
| Determination times | $^{204}$Pb/$^{206}$Pb | 2RSE (%) | $^{207}$Pb/$^{206}$Pb | 2RSE (%) | $^{208}$Pb/$^{206}$Pb | 2RSE (%) |
| 1 | 0.05895 | 0.080 | 0.91367 | 0.045 | 2.1635 | 0.036 |
| 2 | 0.05898 | 0.043 | 0.91393 | 0.028 | 2.1592 | 0.024 |
| 3 | 0.05898 | 0.037 | 0.91243 | 0.023 | 2.1597 | 0.019 |
| 4 | 0.05896 | 0.038 | 0.91287 | 0.020 | 2.1573 | 0.022 |
| 5 | 0.05884 | 0.050 | 0.91246 | 0.021 | 2.1609 | 0.026 |
| 6 | 0.05918 | 0.084 | 0.91376 | 0.027 | 2.1603 | 0.040 |
| 7 | 0.05892 | 0.062 | 0.91387 | 0.043 | 2.1624 | 0.035 |
| 8 | 0.05901 | 0.091 | 0.91339 | 0.032 | 2.1599 | 0.038 |
| 9 | 0.05908 | 0.081 | 0.91409 | 0.051 | 2.1609 | 0.034 |
| 10 | 0.05912 | 0.079 | 0.91390 | 0.025 | 2.1615 | 0.030 |
| 11 | 0.05913 | 0.12 | 0.91320 | 0.025 | 2.1608 | 0.046 |
| 12 | 0.05912 | 0.059 | 0.91284 | 0.026 | 2.1603 | 0.027 |
| 13 | 0.05920 | 0.062 | 0.91320 | 0.032 | 2.1617 | 0.025 |
| 14 | 0.05915 | 0.070 | 0.91362 | 0.033 | 2.1586 | 0.032 |

TABLE 3-continued

Pb isotope determination results of NIST981 with multi-ion counter dynamic multi-collection method

| Determination times | $^{204}Pb/^{206}Pb$ | 2RSE (%) | $^{207}Pb/^{206}Pb$ | 2RSE (%) | $^{208}Pb/^{206}Pb$ | 2RSE (%) |
|---|---|---|---|---|---|---|
| 15 | 0.05917 | 0.067 | 0.91391 | 0.025 | 2.1598 | 0.034 |
| 16 | 0.05912 | 0.066 | 0.91298 | 0.026 | 2.1629 | 0.028 |
| 17 | 0.05924 | 0.063 | 0.91411 | 0.031 | 2.1579 | 0.031 |
| 18 | 0.05908 | 0.072 | 0.91349 | 0.027 | 2.1618 | 0.033 |
| 19 | 0.05910 | 0.068 | 0.91413 | 0.029 | 2.1592 | 0.026 |
| 20 | 0.05915 | 0.048 | 0.91375 | 0.034 | 2.1588 | 0.029 |
| Mean ± SD | 0.05907 ± 0.00011 | | 0.91348 ± 0.00054 | | 2.1604 ± 0.0016 | |
| IC1-C peak-jumping method: Mean ± SD (n = 20) | 0.05909 ± 0.00021 | | 0.91323 ± 0.00071 | | 2.1610 ± 0.0023 | |
| MIC static method: Mean ± SD (n = 20) | 0.05830 ± 0.00028 | | 0.9128 ± 0.0014 | | 2.1680 ± 0.0032 | |

*RSE: relative standard error; SD: standard deviation

Example 2: ID-TIMS U—Pb Age Determination for Qinghu Standard Zircon

The Qinghu zircon is a calibration standard used for SIMS (Secondary Ion Mass Spectrometry) and LA-ICP-MS (Laser Ablation-Inductively Coupled Plasma-Mass Spectrometry) zircon U—Pb age determination. Researchers have previously conducted U—Pb age determination for the Qinghu standard zircon with the ID-TIMS method, and the obtained $^{206}Pb/^{238}U$ weighted average age is 159.45±0.16Ma (±2SE) (referring to the document 2). Recently, the ID-TIMS U—Pb laboratory of Massachusetts Institute of Technology has also conducted ID-TIMS age determination for the Qinghu zircon, and the $^{206}Pb/^{238}U$ weighted average age is 159.36±0.06 Ma (±2SE).

Figure 4A:
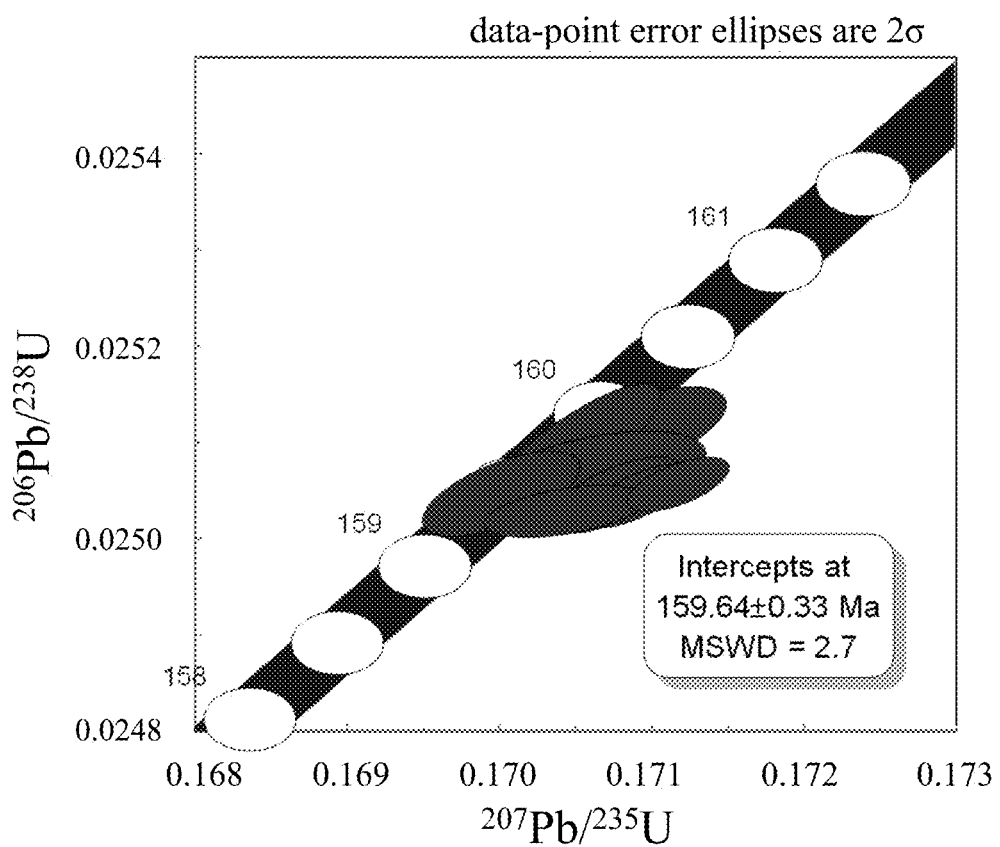
Figure 4B:
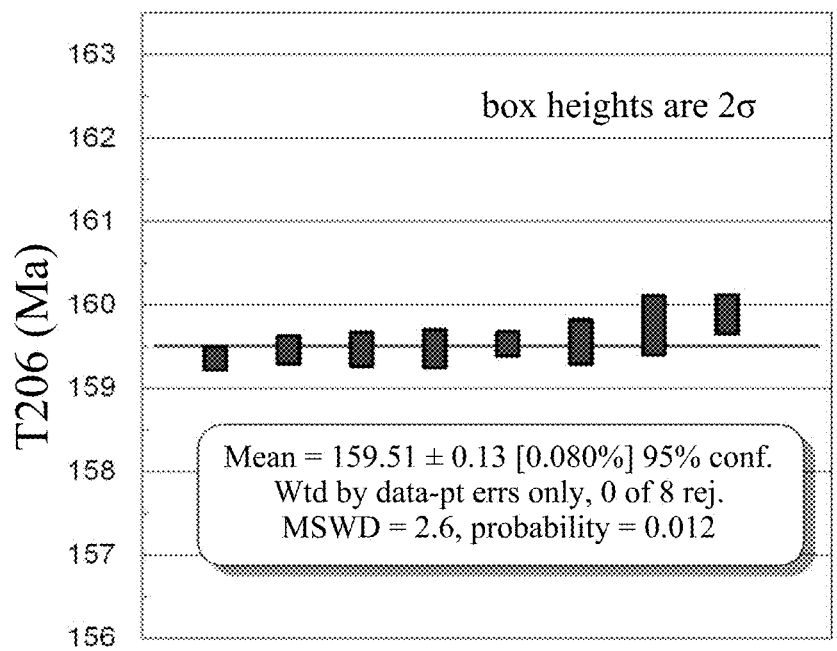

The present invention conducts ID-TIMS U—Pb age determination on the Qinghu standard zircon with a $^{205}Pb$-$^{235}U$ tracer, and the sample digestion and chemical separation method refers to the document 1. During the mass spectrometric determination, the Pb isotopes are determined with the multi-ion counter dynamic method provided by the present invention, and U is determined with the center channel SEM using a peak-jumping method. The $^{206}Pb/^{204}Pb$ determination results are between 360-2560, and the age determination results are illustrated in FIG. 4A and FIG. 4B. The $^{206}Pb/^{238}U$ weighted average age is 159.51±0.13 Ma (±2SE) (2RSE=0.08%, n=8; RSE represents relative standard error, the same hereafter), which is consistent with the values reported in the document 2 and the determination results by the ID-TIMS U—Pb laboratory of Massachusetts Institute of Technology within analytical errors. It is indicated that: with the multi-ion counter dynamic Pb isotope analysis method provided by the present invention, accurate U—Pb age determination results of a zircon sample can be obtained.

Reference document 2: Li X H, Liu Y, Li Q L, et al., Precise determination of Phanerozoic zircon Pb/Pb age by multi-collector SIMS without external standardization, Geochemistry Geophysics Geosystems, 2009, 10: Q04010.

Example 3: ID-TIMS U—Pb Age Determination for TEMORA Standard Zircon

The TEMORA zircon is an international reference standard zircon for U—Pb geochronology. Researchers have previously conducted U—Pb age determination on the TEMORA zircon with the ID-TIMS method, and the obtained $^{206}Pb/^{238}U$ weighted average age is 416.78±0.33 Ma (±2SE) (referring to the document 3). Recently, the inventors have also conducted ID-TIMS age determination on the TEMORA zircon at the ID-TIMS U—Pb laboratory of Massachusetts Institute of Technology, and the $^{206}Pb/^{238}U$ weighted average age is 417.71±0.12 Ma (±2SE).

Figure 5A:
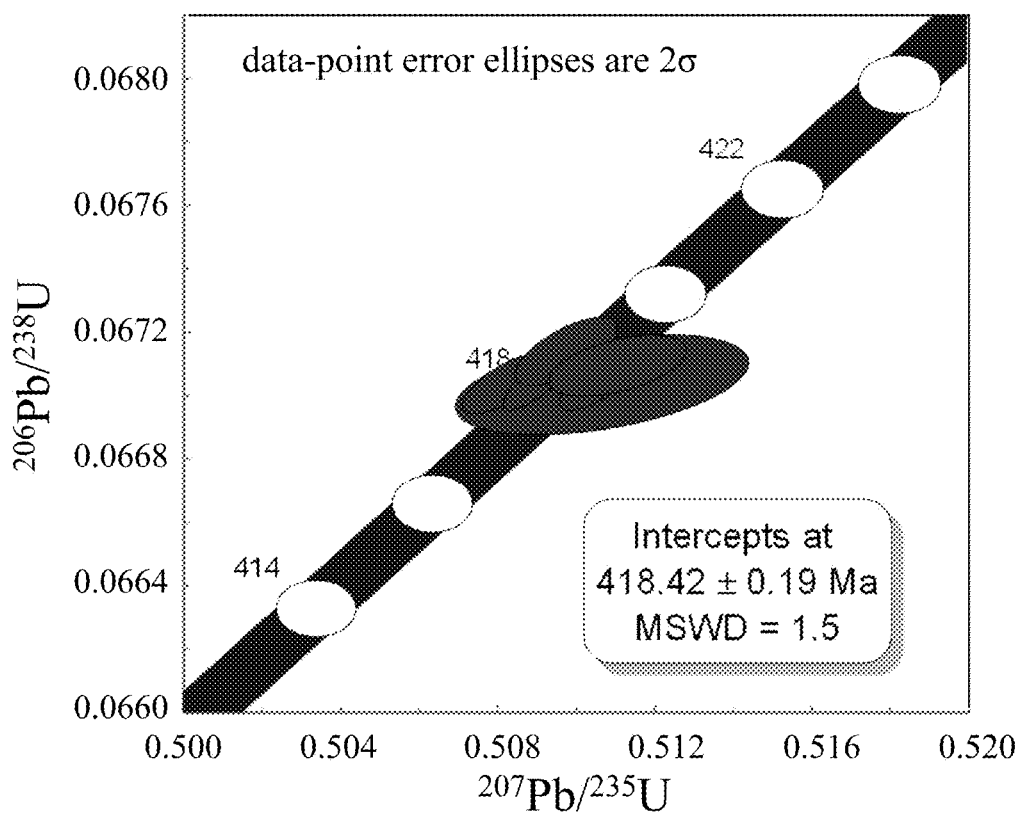
Figure 5B:
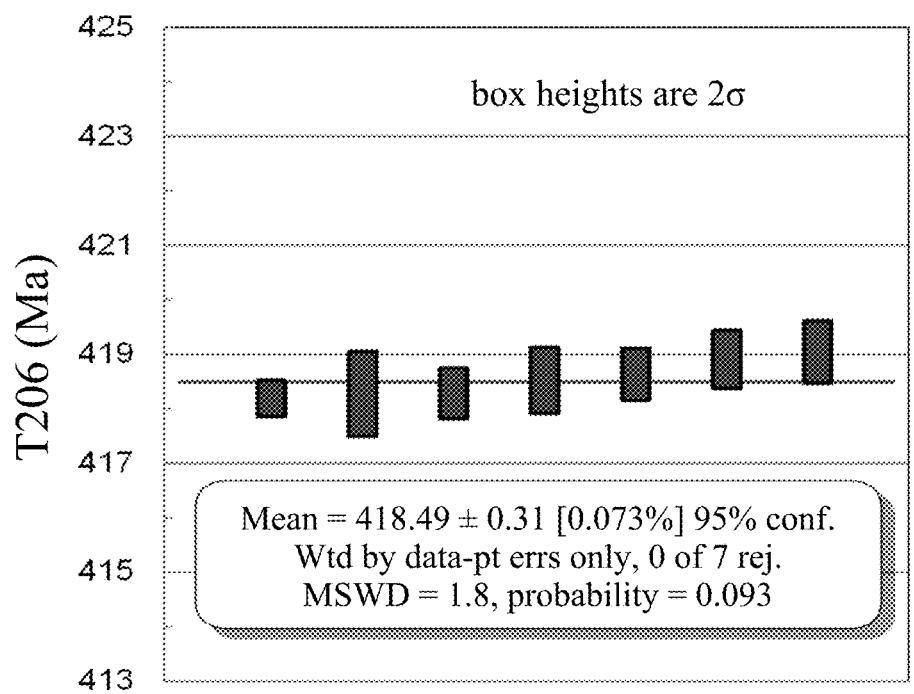

The present invention conducts ID-TIMS U—Pb age determination on the TEMORA standard zircon with a $^{205}Pb$-$^{235}U$ tracer, similarly as the example 2, and the sample digestion and chemical separation method refers to the document 1. During the mass spectrometric determination, the Pb isotopes are determined with the multi-ion counter dynamic method provided by the present invention, and U is determined with the center channel SEM using a peak-jumping method. The $^{206}Pb/^{204}Pb$ determination results are between 300-2630, and the age determination results are illustrated in FIG. 5A and FIG. 5B. The $^{206}Pb/^{238}U$ weighted average age is 418.49±0.31Ma (±2SE) (2RSE=0.07%, n=7); although it is relatively higher than the values ($^{206}Pb/^{238}U$ age=416.78±0.33 Ma) reported in the document 3, it is consistent with the determination results ($^{206}Pb/^{238}U$ age=417.71±0.12 Ma) of the same batch of TEMORA standard zircon by the inventors at the ID-TIMS U—Pb laboratory of Massachusetts Institute of Technology within analytical errors. The example 3 further indicates that: with the dynamic multi-ion counter Pb isotope analysis method provided by the present invention, accurate zircon U—Pb age determination results can be obtained.

Reference document 3: Black L P, Kamo S L, Allen C M, et al., TEMORA 1: A new zircon standard for Phanerozoic U—Pb geochronology, Chem. Geol., 2003, 200: 155-170.

Compared with the conventional single-ion counter peak-jumping method, the multi-ion counter dynamic collection method provided by the present invention increases the collection efficiency of the Pb isotope ion beams by 2.5 times and meanwhile decreases the influences of the ion beam stability on the analysis results of the Pb isotopes. Thus, time-normalized precision for Pb isotope determination for the single-grain zircon ID-TIMS U—Pb analysis is improved, and thus the mass spectrometric determination time of the Pb isotopes can be shortened. In order to obtain a high-precision single-grain zircon ID-TIMS U—Pb age (better than 0.1%), the conventional single-ion counter peak-jumping method generally requires 3.5 hours to complete the Pb isotope analysis of one zircon U—Pb dating sample (including the impurity burn-off time), while the method provided by the present invention generally requires only 2 hours (also including the impurity burn-off time).

It should be understood that: for one of ordinary technique in the field, improvements and variations can be made based on the above description, which should be all encompassed in the protection scope of the claims of the present invention.

What is claimed is:

1. A zircon ID-TIMS (Isotope Dilution-Thermal Ionization Mass Spectrometry) Pb Isotope determination method using multiple ion counters with a dynamic multi-collection protocol, comprising steps of:

(S1) for a Pb sample in which a $^{205}$Pb tracer is added, adopting at least four ion counters of a thermal ionization mass spectrometer, respectively denoted as IC1, IC2, IC3 and IC4;

(S2) designing two times of peak-jumps for isotope determination, respectively denoted as J1 and J2;

(S3) determining all of five isotopes of $^{204}$Pb, $^{205}$Pb, $^{206}$Pb, $^{207}$Pb and $^{208}$Pb, particularly comprising steps of: at a first jump (J1), determining $^{205}$Pb, $^{206}$Pb, $^{207}$Pb and $^{208}$Pb respectively by the four ion counters IC1, IC2, IC3 and IC4; at a second jump (J2), determining $^{204}$Pb, $^{205}$Pb, $^{206}$Pb and $^{207}$Pb respectively by the four ion counters IC1, IC2, IC3 and IC4; and (S4) through appropriately combining Pb isotope signal intensities obtained by the first and second jumps, calculating and obtaining Pb isotope ratios of $^{204}$Pb/$^{206}$Pb, $^{205}$Pb/$^{206}$Pb, $^{207}$Pb/$^{206}$Pb and $^{208}$Pb/$^{206}$Pb, particularly comprising steps of:

(S41) with $^{207}$Pb determined by the IC3 from the first jump and $^{206}$Pb determined by the IC3 from the second jump, obtaining $^{207}$Pb/$^{206}$Pb, denoted as $^{207}$Pb$_{IC3-J1}$/$^{206}$Pb$_{IC3-J2}$;

(S42) with $^{208}$Pb determined by the IC4 from the first jump and $^{207}$Pb determined by the IC4 from the second jump, obtaining $^{208}$Pb/$^{207}$Pb, denoted as $^{208}$Pb$_{IC4-J1}$/$^{207}$Pb$_{IC4-J2}$; through calculating with a formula of $^{208}$Pb/$^{206}$Pb=$^{207}$Pb$_{IC3-J1}$/$^{206}$Pb$_{IC3-J2}$×$^{208}$Pb$_{IC4-J1}$/$^{207}$Pb$_{IC4-J2}$, obtaining $^{208}$Pb/$^{206}$Pb;

(S43) with $^{205}$Pb determined by the IC2 from the second jump and $^{206}$Pb determined by the IC2 from the first jump, obtaining $^{205}$Pb/$^{206}$Pb, denoted as $^{205}$Pb$_{IC2-J2}$/$^{206}$Pb$_{IC2-J1}$; and (S44) with $^{204}$Pb determined by the IC1 from the second jump and $^{205}$Pb determined by the IC1 from the first jump, obtaining $^{204}$Pb/$^{205}$Pb, denoted as $^{204}$Pb$_{IC1-J2}$/$^{205}$Pb$_{IC1-J1}$; through calculating with a formula of $^{204}$Pb/$^{206}$Pb=$^{205}$Pb$_{IC2-J2}$/$^{206}$Pb$_{IC2-J1}$×$^{204}$Pb$_{IC1-J2}$/$^{205}$Pb$_{IC1-J1}$, obtaining $^{204}$Pb/$^{206}$Pb.

2. The determination method, as recited in claim 1, wherein: the obtained ratios of $^{204}$Pb/$^{206}$Pb, $^{205}$Pb/$^{206}$Pb, $^{207}$Pb/$^{206}$Pb and $^{208}$Pb/$^{206}$Pb are all determined by peak-jumps with a same ion counter, which completely eliminates influences of gain differences of the ion counters on determination results of the Pb isotopes.

3. The determination method, as recited in claim 1, wherein: in the steps of S41-S44, a linear interpolation method is adopted to correct influences of ion beam stability on determination results of each isotope ratio during a peak-jump determination process by the multiple ion counters.

4. The determination method, as recited in claim 1, wherein: when determining Pb isotope ratios of a sample by the determination method, because $^{204}$Pb/$^{206}$Pb is obtained through a calculation of $^{204}$Pb/$^{206}$Pb=$^{205}$Pb$_{IC2-J2}$/$^{206}$Pb$_{IC2-J1}$×$^{204}$Pb$_{IC1-J2}$/$^{205}$Pb$_{IC1-J1}$, the method is only applicable to Pb isotope analysis of a $^{205}$Pb—Pb mixture.

5. The determination method, as recited in claim 1, wherein: the method completes determination of all Pb isotope ratios with only two times of peak-jumps; compared with a conventional single-ion counter (SEM (Secondary Electronic Multiplier) or Daly detector) method which completes determination of all Pb isotopes with five times of peak-jumps, the determination method increases a collection efficiency of Pb ion beams by 2.5 times and meanwhile decreases influences of ion beam stability during a Pb isotope determination process on determination results of each isotope ratio, so that time-normalized precision for Pb isotope determination of a $^{205}$Pb—Pb mixture is improved; compared with a commonly used Pb isotope determination method with a static multi-collection protocol by the multiple ion counters, the determination method completely eliminates influences of gain differences of the different ion counters on the determination results of the Pb isotopes, so that an analytical precision is greatly improved.

6. The determination method, as recited in claim 1, wherein: the determination method is especially applicable to Pb isotope analysis for a single-grain zircon ID-TIMS U—Pb dating method.

7. The determination method, as recited in claim 1, wherein: the protocol of the established determination method has universality and is suitable for various types of mass spectrometers equipped with a multi-ion counter system which can be applied for Pb isotope analysis of a $^{205}$Pb—Pb mixture.

* * * * *